United States Patent [19]

Takahashi et al.

[11] Patent Number: 4,868,698
[45] Date of Patent: Sep. 19, 1989

[54] MAGNETIC HEAD

[75] Inventors: Ken Takahashi, Suita; hiroshi Yohda, Hirakata, both of Japan

[73] Assignee: Matsushita Electric Industrial Co., Ltd., Osaka, Japan

[21] Appl. No.: 163,105

[22] Filed: Mar. 2, 1988

[30] Foreign Application Priority Data

Mar. 5, 1987 [JP] Japan .................................. 62-50554
Jun. 15, 1987 [JP] Japan ................................ 62-148546

[51] Int. Cl.$^4$ ............................................ G11B 5/147
[52] U.S. Cl. .................................................... 360/126
[58] Field of Search ...................... 360/126, 125, 127; 29/603; 428/635, 928

[56] References Cited

U.S. PATENT DOCUMENTS 3,350,180 10/1967 Croll .................................... 428/635
4,516,180 5/1985 Narishige et al. .................... 360/126
4,748,089 5/1988 Kumasaka et al. .................. 428/635

FOREIGN PATENT DOCUMENTS 55-64621 5/1980 Japan .................................. 360/126

OTHER PUBLICATIONS

Thompson et al., "Laminated Films with Alternately Skewed Easy Axis Magnetic Transducers", IBM TDR, vol. 19, No. 8, Jan. 1977, pp. 3234-3235.

Primary Examiner—John H. Wolff
Assistant Examiner—Matthew J. Bussan
Attorney, Agent, or Firm—Wenderoth, Lind & Ponack

[57] ABSTRACT

A magnetic head having a recording capacity for sufficiently deriving performance of a high coercive magnetic tape and capable of recording and reproducing signals of very high frequencies at high efficiency. The magnetic head of the present invention includes ferromagnetic thin films and insulative thin films alternately laminated one upon another to form a multi-layered film magnetic core which constitutes part or all of a magnetic path, with the ferromagnetic thin films being so arranged that the directions of their anisotropy are different from each other, and thus, Snoek's limit, due to ferromagnetic resonance, is broken through, thus, making it possible to record and reproduce signals in an efficient manner up to high frequency band regions.

10 Claims, 2 Drawing Sheets

MAGNETIC HEAD

BACKGROUND OF THE INVENTION

The present invention relates to a magnetic head for efficiently, recording and reproducing high frequency signals and which is suitable for use in systems dealing with such high frequency signals, such as a high-definition video tape recorder, digital video tape recorder or the like.

Conventionally, in devices for recording and reproducing high frequency signals such as video tape recorders, etc., ferrite material with little high frequency loss has been generally employed as a magnetic material for the video heads. In recent years, however, systems dealing with signals in a still wider band region, such as a high-definition video tape recorder, digital video tape recorder or the like, are being vigorously developed, and recording media therefor are being altered from iron oxide media to high coercive media such as metal powder media, metal evaporated media, etc. in the trend towards high density construction for recording such a large amount of information. Meanwhile, the ferrite head has its maximum magnetic flux density at about 5000 gauss, and for efficiently reproducing short-wave length signals; it is required to use narrow gaps, and thus, in the high coercive media having Hc higher than 1000 oersted, the ferrite core at the gap forward end portion is saturated, making it impossible to effect perfect recording. Accordingly, development of a magnetic head employing metallic magnetic materials such as sendust and amorphous magnetic alloys having high maximum flux density has been attempted, but the metallic magnetic material in a bulk state as employed has a large high frequency loss due to eddy current, and can hardly be used for the system as described above. For this, use of the metallic magnetic material formed into a thin film has been investigated in order to suppress such a loss as far as possible, and by way of example, it is intended to cope with high frequencies by constituting the main magnetic circuit as a laminated structure of the metallic magnetic thin films and insulative thin films.

In a high-definition video tape recorder, digital video tape recorder, etc., the recording signal band region thereof extends in the range of 30 to 60 MHz, and as the core material for the magnetic head, a material having a high initial permeability in such a high frequency band region is required.

In the diagram of FIG. 5, there is shown a frequency characteristic of initial permeability where direction of anisotropy of an amorphous magnetic thin film with respect to a measuring direction is altered, in a laminated structure of CoNb Ta Zr amorphous magnetic thin film and SiO$_2$ film. The thickness of the magnetic thin film per one layer is set to be 4 μm by taking the eddy current loss into consideration, and SiO$_2$ film thickness between layers is set at 0.2 μm for lamination in 5 layers.

In FIG. 5, a curve (1) represents a random oriented lamination film, in which, although the eddy current loss is improved by the lamination effect, the high frequency characteristic thereof is restricted by Snoek's limit due to ferromagnetic resonance, and the initial permeability at the high frequency band region above 30 MHz falls below 500. Therefore, such a random oriented magnetic film, if employed as a head core, can not correspond to the high frequency system as described earlier.

On the other hand, the initial permeability characteristic of a multi-layer film in which amorphous magnetic thin films having uniaxial anisotropy are laminated, with directions of easy axes thereof aligned, is as shown in FIG. 5, and upon measurement in the direction of the easy axis, an extremely low initial permeability characteristic is observed over the entire frequency band region as represented by a curve (2), while upon measurement in the direction of the hard axis, high initial permeability is maintained up to high frequencies as represented by a curve (3), with a value above 1000 even at 60 MHz.

However, in the case where a magnetic head having a comparatively large coil winding opening, as in a video head or the like, is constituted by the magnetic core having anisotropy in one direction, the easy axis direction is to be contained in its magnetic path, with a large reduction in head efficiency. Moreover, constitution of all magnetic paths in the hard axis direction is very difficult from the viewpoint of head manufacturing methods.

SUMMARY OF THE INVENTION

Accordingly, an essential object of the present invention is to provide an improved magnetic head, which is capable of efficiently recording and reproducing signals up to a high frequency band region by breaking through Snoek's limit.

Another important object of the present invention is to provide a magnetic head of the above described type, which is simple in construction and stable when functioning, and can be readily manufactured on a large scale at low cost.

In accomplishing these and other objects, according to one preferred embodiment of the present invention, there is provided a magnetic head which includes ferromagnetic thin films and insulative thin films alternately laminated one upon another to form a multi-layered film magnetic core which constitutes part of all of a magnetic path, with the ferromagnetic thin films being so arranged that the directions of anisotropy thereof are different from each other.

According to the present invention, by employing the multi-layered magnetic core including the ferromagnetic thin films with different directions of anisotropy as the head core, it is possible to obtain the initial permeability characteristic exceeding the limit, due to the ferromagnetic resonance, by which the high frequency characteristics have been conventionally restricted, while, due to the fact that the initial permeability characteristic may be exhibited in most of the magnetic path of the magnetic head, an improved magnetic head capable of recording and reproducing signals at high efficiency even in the high frequency band region over 30 MHz can be obtained.

BRIEF DESCRIPTION OF THE DRAWINGS

These and other objects and features of the present invention will become apparent from the following description with reference to the accompanying drawings, in which.

DETAILED DESCRIPTION OF THE INVENTION

Figure 1:
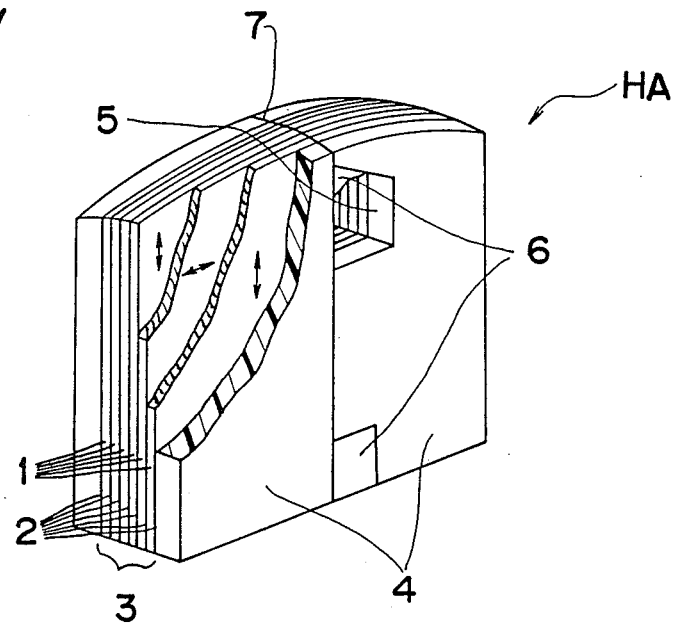
FIG. 1 is a perspective view, in partial section, of a magnetic head according to one preferred embodiment of the present invention.

Before the description of the present invention proceeds, it is to be noted that like parts are designated by like reference numerals throughout the accompanying drawings.

Referring now to the drawings, there is shown in FIG. 1 a magnetic head HA according to a first embodiment of the present invention which includes ferromagnetic thin films 1 and insulative thin films 2 alternately laminated one upon another to form a multi-layered film magnetic core 3 which constitutes part of all of a magnetic path, with the ferromagnetic thin films 1 being so arranged that directions of anisotropy thereof are different from each other.

The ferromagnetic thin films 1 are each made of an amorphous magnetic alloy, sendust alloy, or the like, with a film thickness per layer being set by taking into account the eddy current loss in the working frequency band region. The films 1 are laminated with the insulative thin films 2 of $SiO_2$, etc., to form the magnetic core 3, which is thus constituted by a multi-layered film. The ferromagnetic thin films 1 having uniaxial anisotropy in the magnetic path include those whose directions of easy axes are disposed generally to intersect at right angles with the face of a magnetic gap 7, and those whose directions of easy axes are directed generally to be parallel with the face of the magnetic gap 7. As shown by the arrows in the broken away portions in FIG. 1, this is both the films constituting the magnetic core 3. The magnetic core 3 composed of such laminated film is held between non-magnetic substrates 4 of a $NiO-MgO-TiO_2$ ceramic material, etc., and joined with a confronting core having a coil winding opening 5 by use of a bonding material, e.g. bonding glass 6, thereby forming the magnetic gap 7.

Figure 5:
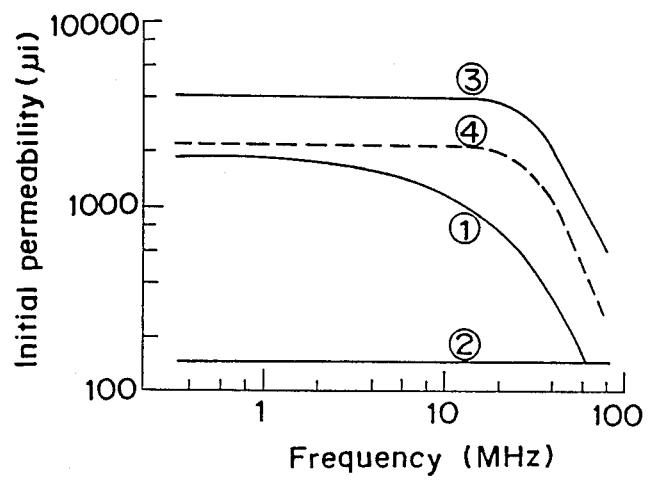
FIG. 5 is a graph showing measurements of initial permeability characteristics of ferromagnetic thin films according to directions of anisotropy.

In the multi-layered film in which the alternating amorphous thin films are laminated so that the directions of anisotropy thereof intersect generally at right angles with each other, the initial permeability characteristic as measured in the direction of one anisotropy is represented by a curve (4) in FIG. 5. As is seen from the figure, the initial permeability thereof is approximately half of the value as measured in the hard axis direction, but the frequency characteristic thereof is generally equal to that in the hard axis direction, having a value of about 1000 even at 40 MHz. When the measuring direction is further rotated through 90° for measurement in the other direction of anisotropy, a generally similar characteristic is also obtained. Therefore, since most of the magnetic path of the magnetic head in FIG. 1 functions by the initial permeability characteristic as shown by curve (4) in FIG. 5, a high head efficiency is achieved even at high frequencies above 30 MHz.

For a manufacturing process of such magnetic head HA as described above, in the first place, the ferromagnetic thin films and insulative magnetic thin films are alternately formed by sputtering on the non-magnetic substrate. In the above case, by sputtering the ferromagnetic thin films in a fixed magnetic field so as to form the laminated layer while rotating the magnet position through 90° for each new layer, the multi-layered film in which directions of anisotropy alternately intersect generally at right angles with each other as described above can be readily obtained. By piling one upon another, a plurality of head substrates of the multi-layered film are formed. This is followed by bonding by crystallized glass, etc. and subsequent cutting off, whereby core blocks in which the multi-layered films and non-magnetic substrates are alternately laminated are prepared. Thereafter, through similar process as in conventional manufacturing methods for ferrite heads, the magnetic head as shown in FIG. 1 is produced.

It should be noted here that, for laminating the ferromagnetic thin films having different directions of anisotropy, the ferromagnetic thin films with the same direction of anisotropy may be disposed in a group of several layers, but a higher head efficiency on the whole can be achieved when the ferromagnetic thin films are disposed so that the directions of anisotropy thereof alternately, owing to the fact that when the direction of the magnetic path is changed, the layer with high initial permeability comes at the opposite sides of said layer.

Figure 2:
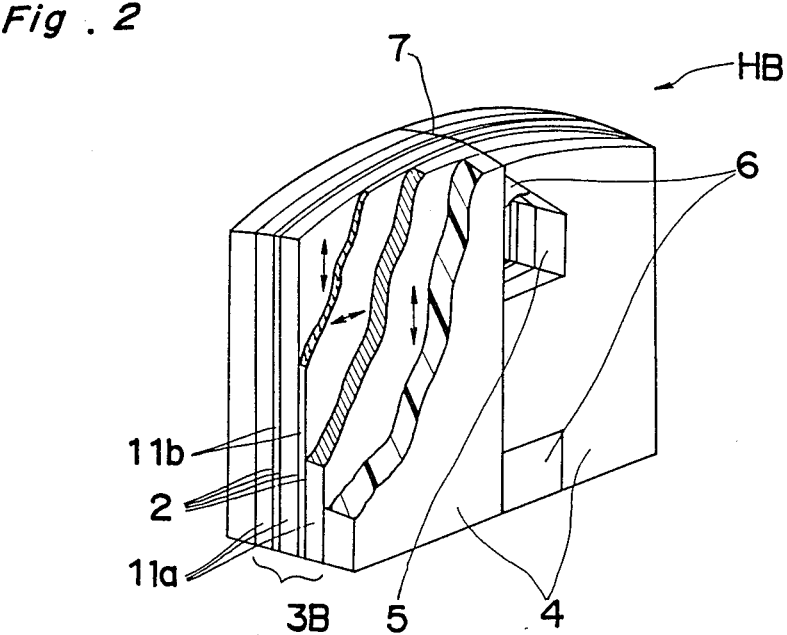
FIG. 2 is a view similar to FIG. 1, of an second embodiment according to the present invention.

Referring to FIG. 2, there is shown a magnetic head HB according to a second embodiment of the present invention, which includes ferromagnetic thin films 11 and insulative thin films 2 alternately laminated one upon another to form a multi-layered film magnetic core 3B which constitutes part of all of a magnetic path. The ferromagnetic thin films 11 are so arranged that the directions of anisotropy of first and second sets 11a and 11b of said ferromagnetic thin films 11 intersect generally at right angles with each other, and with the direction of magnetization easy axis for the first set 11a thereof being adapted to generally intersect at right angles with a recording medium sliding surface. The total thickness of the first set 11a of the ferromagnetic thin films 11 whose direction of magnetization easy axis intersects generally at right angles with the recording medium sliding surface, is larger than the total thickness of the second set 11b of the ferromagnetic thin films 11.

More specifically, the ferromagnetic thin films 11a and 11b, made of amorphous alloy, sendust alloy or the like, have uniaxial anisotropy in the magnetic path, and as shown by the arrows in the broken away portions in FIG. 2, the first set 11a of the ferromagnetic thin films 11 have the direction of the easy axis thereof directed to generally intersect at right angles with the recording medium sliding surface, while the second set 11b of the ferromagnetic thin films 11 have the easy axis thereof directed in the direction generally intersecting at right angles with that of the first set 11a. These ferromagnetic thin films 11a and 11b are laminated with the insulative thin films 2 of $SiO_2$, etc., to form the magnetic core 3B constituted by the multi-layered film. The film thickness per one layer is set to be less than the thickness in which eddy current loss in the working frequency band region is taken into account. Moreover, as referred to above, the total thickness of the first set 11a of the ferromagnetic thin films 11 whose direction of magnetization easy axis intersects generally at right angles with the recording medium sliding surface, is set to be larger than the total thickness of the second set 11b of the ferromagnetic thin films 11.

In a similar manner as in the magnetic head HA in FIG. 1, the magnetic core 3B composed of such laminated film is held between non-magnetic substrates 4 of NiO-MgO-TiO$_2$ ceramic material, etc., and joined with a confronting core having a coil winding opening 5 by bonding glass 6 and the like, thereby forming a magnetic gap 7.

Figure 3:
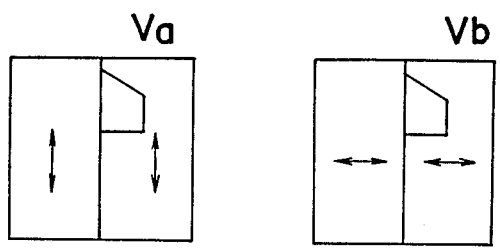
FIG. 3 is a top plan view of examples of video heads constituted by ferromagnetic thin films having uniaxial anisotropy.
Figure 4:
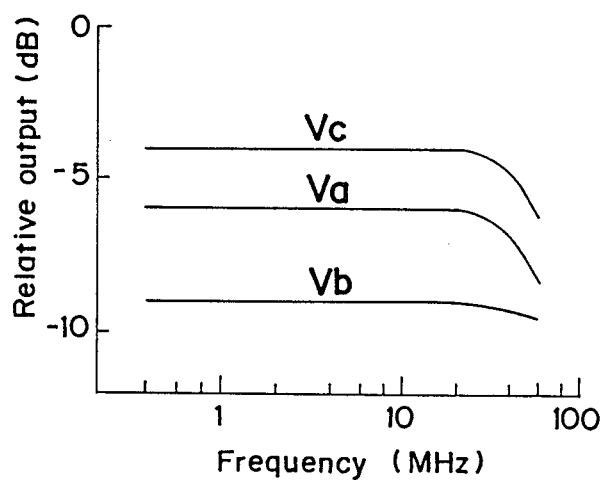
FIG. 4 is a graph showing head output characteristics of the video heads shown in FIG. 3 and of the second embodiment according to the present invention.

According to experiments carried out by the present inventors, video heads Va and Vb are prepared using amorphous magnetic thin films having uniaxial anisotropy in the same directions as shown in FIG. 3, and head output characteristics thereof were measured, with results as given in FIG. 4.

As is seen from FIG. 4, the head Va in which the magnetization easy axis is directed to intersect at right angles with the recording medium sliding surface, provided head output considerably higher than that of the head Vb in which the easy axis is directed to be parallel with the recording medium sliding surface. This may be attributable to the fact that, in the head Vb, in the direction at a right angle to the recording medium sliding surface, i.e. in the direction parallel with the gap face, the initial permeability in the vicinity of the magnetic gap is high, and most of the signal flux generated from signal magnetization on the recording medium flows along the gap face, and accordingly, it is considered that leakage flux at the magnetic gap is increased to thereby reduce the reproduction efficiency. On the other hand, in the head Va, since the initial permeability in the direction parallel with the gap face is considerably smaller, and most of the signal flux flowing in from the forward end of the gap flows in the direction parallel with the sliding face having high initial permeability, the magnetic flux flowing along the gap face is reduced, and consequently, it is considered that the leakage flux at the magnetic gap portion is reduced for an increase in the reproduction efficiency. Such a trend may be clearly seen from the magnetic flux diagram showing the results as calculated by the finite element method.

In FIG. 4, a curve Vc represents head output characteristics of a video head according to the present invention, in which the thickness of the ferromagnetic thin film 11a whose easy axis direction intersects at right angles with the recording medium sliding surface is set at 3μm, and the thickness of the ferromagnetic thin film 11b whose easy axis direction is parallel to the sliding surface, is set at 1μm for the lamination.

According to the arrangement of the present invention, as referred to earlier, in the vicinity of the magnetic gap, since the ferromagnetic thin film 11a having the high initial permeability in the direction parallel to the sliding surface is superior in terms of cross sectional area so as to be dominant, the leakage flux is reduced for an improvement of the reproduction efficiency. Moreover, due to the fact that the width of the magnetic path is large at the magnetic path portion in the direction intersecting at right angles with the sliding surface, even if the film thickness is thin, the ferromagnetic thin film 11b whose initial permeability in the direction intersecting at right angles with the sliding surface is high, becomes dominant. As a result, since the characteristics in the direction of the hard axis may be effectively utilized in most of the magnetic path, the signal can be recorded or reproduced at a sufficiently high efficiency even in the high frequency region above 30 MHz.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A magnetic head, including:
   a multi-layered magnetic core, said core comprising;
   a plurality of ferromagnetic thin films having uniaxial anisotropy within the plane of each film; and
   a plurality of insulating thin films;
   said ferromagnetic films and said insulating films alternately disposed in a laminated stack, and the direction of anisotropy of alternate ones of said ferromagnetic films in said stack arranged generally perpendicular to the direction of anisotropy of remaining ones of said ferromagnetic films in said stack.

2. A magnetic head as in claim 1, wherein said ferromagnetic thin films are formed of an amorphous magnetic alloy.

3. A magnetic head as in claim 1, wherein said ferromagnetic thin films are formed of sendust alloy.

4. A magnetic head as in claim 1, wherein said insulating thin films are formed of SiO$_2$.

5. A magnetic head, including:
   a multi-layered magnetic core, said core comprising;
   a plurality of ferromagnetic thin films having uniaxial anisotropy within the plane of each film; and
   a plurality of insulating thin films;
   said ferromagnetic films and said insulating films alternately disposed in a laminated stack, the direction of anisotropy of alternate ones of said ferromagnetic films in said stack arranged generally perpendicular to the direction of anisotropy of remaining ones of said ferromagnetic films in said stack, the easy axis of magnetization of said alternate ones of said ferromagnetic films arranged to be generally normal to a sliding surface of a recording medium, and the combined thickness of said alternate ones of said ferromagnetic films is greater than the combined thickness of said remaining ones of said ferromagnetic films.

6. A magnetic head as in claim 5, wherein the thickness of each of said alternate ones of said ferromagnetic films is greater than the thickness of each of said remaining ones of said ferromagnetic films.

7. A magnetic head as in claim 6, wherein the thickness of each of said alternate ones of said ferromagnetic films is approximately three times greater than the thickness of each of said remaining ones of said ferromagnetic films.

8. A magnetic head as in claim 5, wherein said ferromagnetic thin films are formed of an amorphous magnetic alloy.

9. A magnetic head as in claim 5, wherein said ferromagnetic thin films are formed of sendust alloy.

10. A magnetic head as in claim 5, wherein said insulating thin films are formed of SiO$_2$.

* * * * *